United States Patent [19]
Takada, deceased

[11] 3,927,912
[45] Dec. 23, 1975

[54] AUTOMATIC BRAKING SAFETY BELT REEL

[75] Inventor: Takezo Takada, deceased, late of Tokyo, Japan, by Juichiro Takada, legal authorized heir

[73] Assignee: Takata Kojyo Co., Ltd., Tokyo, Japan

[22] Filed: Apr. 29, 1974

[21] Appl. No.: 465,020

[30] Foreign Application Priority Data
May 2, 1973  Japan.............................. 48-051206

[52] U.S. Cl. ................ 297/388; 24/170; 242/107.4
[51] Int. Cl.² ................... A62B 35/00; A44B 11/12
[58] Field of Search................. 242/107.4; 297/388; 24/170

[56] References Cited
UNITED STATES PATENTS

| | | | |
|---|---|---|---|
| 2,822,595 | 2/1958 | Ruhl | 24/170 |
| 3,231,307 | 1/1966 | Smith | 297/388 X |
| 3,246,929 | 4/1966 | Taggart | 297/388 |
| 3,313,572 | 4/1967 | Smith | 297/388 |
| 3,384,415 | 5/1968 | Monroe | 297/388 |

Primary Examiner—James T. McCall
Attorney, Agent, or Firm—Wolder & Gross

[57] ABSTRACT

A vehicle safety belt device includes a frame having a cross piece and forwardly directed side legs supporting between their front ends a rockable transverse brake bar and a coupling tongue is supported by the brake bar for swinging between belt brake and release positions. A take-up shaft extends between the side legs and is spring biased in a belt rewind direction by a spiral spring housed in a cap along an inside face of a frame leg, and is connected to an end of a belt. The frame side legs and cross piece are of widths less than the diameter of the coil of the fully rewound belt. The belt extends from the shaft through a brake area defined by the brake bar and an opening in the tongue.

6 Claims, 3 Drawing Figures

AUTOMATIC BRAKING SAFETY BELT REEL

BACKGROUND OF THE INVENTION

The present invention relates generally to improvements in vehicle safety belt systems, and it relates more particularly to an improved automatic belt braking reel of the type mounted to the free end of the safety belt and provided with a releasable coupling member.

The safety belt commonly provided at the rear seat of the vehicle is designed with special consideration given to appearance and the comfort of the passenger and to this end, employs an automatic locking type winding device comprising a frame mounted to the rear part of the tongue member which is releasably coupled to the buckle proper and shielded by a cover. The frame of the winding device thus shielded by a cover cannot be made too large and due to the limited winding capacity of the helical spring consistent with the shape of the frame, a belt of up to only 500 mm long can be used. Hence, the mounting position of the device is naturally restricted, and the passenger of larger girth cannot wear the belt.

SUMMARY OF THE INVENTION

It is a principal object of the present invention to provide an improved vehicle safety belt device.

Another object of the present invention is to provide an improved automatic belt braking vehicle safety belt rewind reel device.

Still another object of the present invention is to provide an improved automatic belt braking rewind reel of the type located at the free end of the belt, and have a buckle coupling member, such as the buckle tongue or the like.

A further object of the present invention is to provide a belt carried rewind reel in which the need for a frame cover is obviated and belts of lengths as great as 800 mm. may be spring rewound onto the reel, thereby permitting the application of the safety belt to passengers or seat occupants of large girth.

Still a further object of the present invention is to provide a device of the above nature characterized by its attractive appearance, comfort in use, ruggedness, reliability, simplicity, and high versatility and adaptability.

The above and other objects of the present invention will become apparent from a reading of the following description taken in conjunction with the accompanying drawings, which illustrate preferred embodiments thereof.

In a sense, the present invention contemplates the provision of a vehicle safety belt reel comprising a frame member, including a cross piece and a pair of transversely spaced longitudinally parallel side legs extending from the cross piece, a coupling member connected to and projecting forwardly from the frame member, a spool extending between and rotatably supported by the side legs, a safety belt having a first end connected to the spool and its opposite end anchored and a spring resiliently biasing the spool to wind up the belt in a coil therein, the frame cross piece and side legs being of widths less than the diameter of the coil of the fully rewound belt.

In the preferred form of the improved reel device, the spool comprises a slotted shaft journalled in axially aligned openings in the frame side legs, the belt end engaging the shaft slot and the spring includes a housed spiral leaf spring located along the inside face of a frame leg and having its inner end secured to the shaft and its outer end secured to the spring housing. The coupling member is a buckle mating tongue provided with a rear cross web having a wide transverse opening and longitudinally slotted side plates extending along the cross web edges. A belt locking bar is rotatably supported between the forward ends of the frame side legs and has rectangular end projections slideably engaging the slots in the side plates. The belt extends from the spool through the cross web opening, around the brake bar and back through the opening to the vehicle anchor point.

The improved automatic braking belt rewind reel is highly compact and accommodates long safety belts, is comfortable to the passenger, is rugged, simple, reliable, highly attractive and of great versatility and adaptability.

DESCRIPTION OF THE PREFERRED EMBODIMENT

Figure 1:
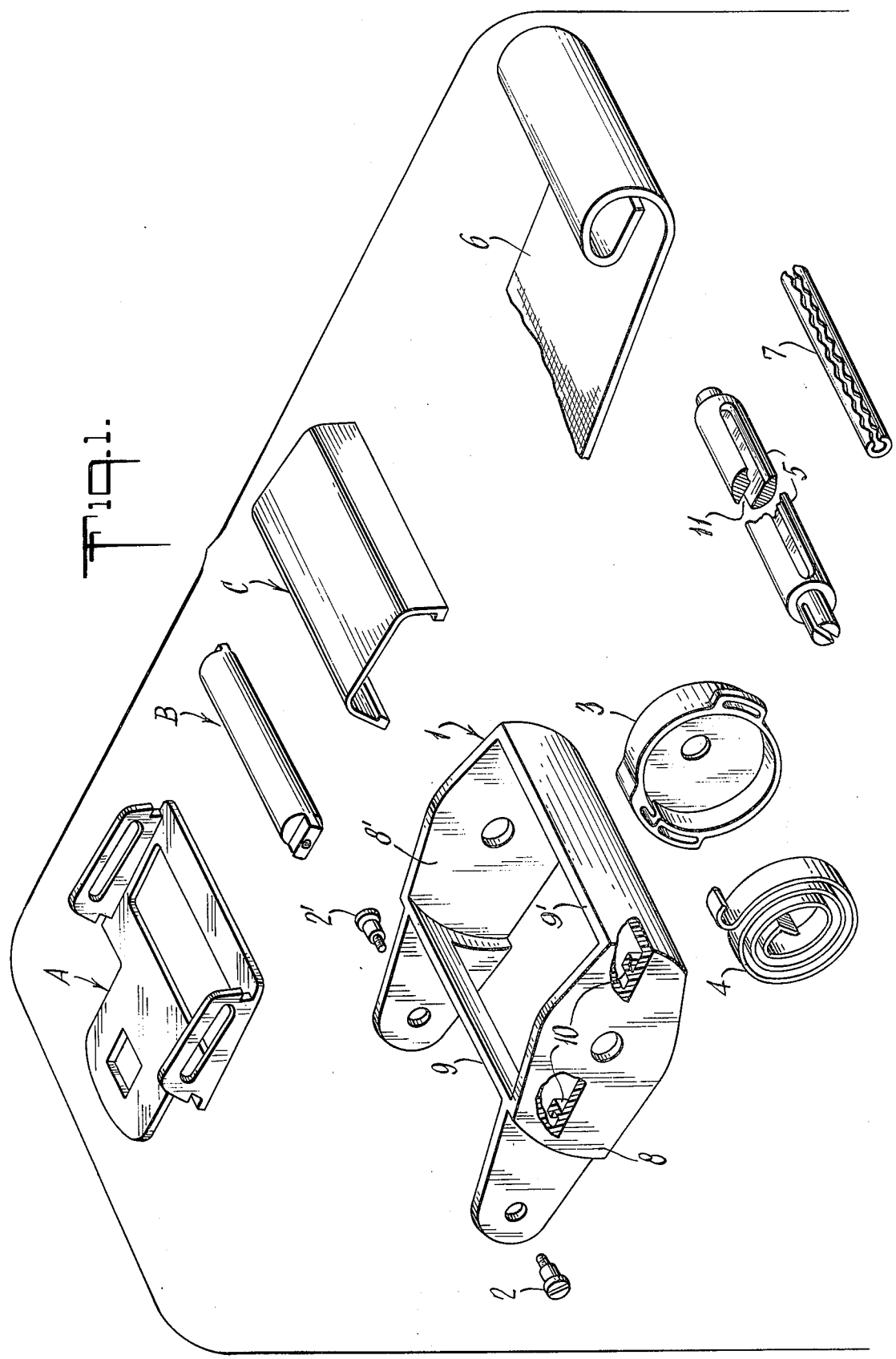
FIG. 1 is an exploded perspective view partially fragmented, of a vehicle safety belt reel embodying the present invention.

Referring now to the drawings which illustrate a preferred embodiment of the present invention, the reference letter A generally designates a tongue member which may be releasably coupled to a mating buckle in the known manner, B is a belt brake bar and C is a tongue rear section cover member or shell. The tongue member A includes a forward tongue element and a rear cross web having a wide transverse slot, a pair of side walls projecting upwardly from the cross web parallel side edges and having longitudinal slots formed therein. The cover C engages and extends between the edges of the side walls and encloses the underlying space.

A frame member 1 is integrally formed of a resilient polymeric resin of any suitable composition and includes a pair of parallel transversely spaced longitudinal side legs 8, 8' joined at their rears by a cross piece 9' and at points rearwardly of their front ends by an upwardly disposed cross piece 9. Formed in the frame legs 8, 8' are a first pair of axially transversely aligned holes intermediate cross pieces 9, 9' and a second pair of axially transversely aligned holes proximate the front free ends of frame legs 8, 8'. The widths of the frame legs 8, 8' and cross pieces 9, 9' are each less than the diameter of the coil of the belt 6 fully rewound on the spool shaft 5, as will be hereinafter described.

A spool defining shaft 5 having a longitudinal slot 11 formed therein extends transversely between frame side legs 8, 8' intermediate cross pieces 9, 9' and includes stub shaft axial projections of reduced diameter journalled in the intermediate holes in frame side legs 8, 8', the longer of the stub shafts having a longitudinal slot extending for the length thereof. A pair of longitudinally spaced inwardly directed projections 10 are formed on the inside face of frame side leg 8 and engage a pair of corresponding opposite apertured ears formed on the peripheral wall of a cup shaped casing 3 provided with a circular inner wall having a center opening through which the slotted stub shaft projects. Housed in the casing 10, is a wind-up spiral leaf spring whose inner end engages the slot in the stub shaft and whose outer end engages a recess formed in the peripheral wall of casing 3. The casing 3 is suitably secured to the frame side leg 8.

Figure 2:
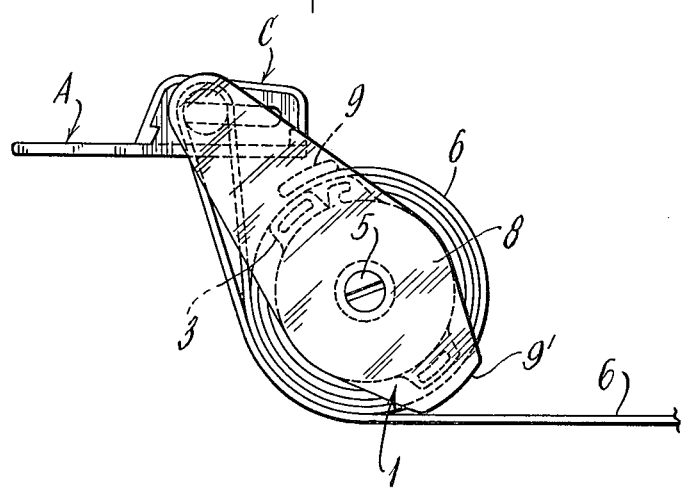
FIG. 2 is a side elevational view of the assembled reel in a belt fully rewound and unbraked condition.
Figure 3:
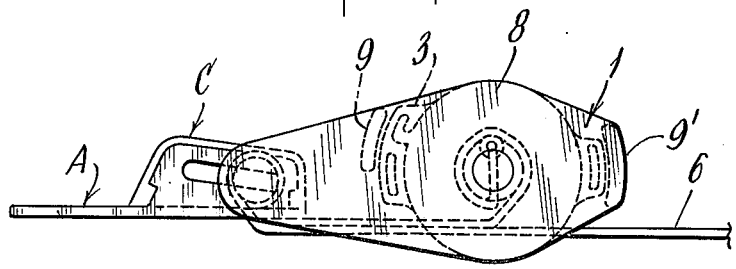
FIG. 3 is a view similar to FIG. 2 showing the belt in a retracted braked condition.

Stepped pivot screws 2, 2' rotatably register with the front holes in the frame side legs 8, 8' and engage tapped bores formed in the end faces of brake bar B which terminates at its ends in rectangular axial projections which slideably engage the slots in the tongue member side walls so that the tongue member A is slideably connected to brake bar B and is swingable therewith. A safety belt or web 6 has a first end projecting through shaft slot 11 and is affixed to the shaft 5 by a split sleeve 7 having toothed confronting longitudinal edges engaging the belt end projecting through slot 11. The belt 6 extends from the reel upwardly through the tongue member opening, around the top of brake bar B from the rear to the front thereof, and thence downwardly through the tongue member opening and rearwardly to an anchor point on the vehicle. The spring 4 is preloaded or wound, so as to bias the shaft 5 to fully rewind the belt 6 in a coil on the shaft 5 with a belt of a length of about 800 mm. for example. When the belt 6 is fully spring rewound on shaft 5 and thus fully retracted, as shown in FIG. 2, the resulting coil has a diameter much greater than the widths of frame side legs 8, 8' and cross pieces 9, 9' and extends substantially to the confronting faces of cross pieces 9, 9' which faces are cylindrically concave and coaxial with shaft 5. In the fully extracted position of belt 6, as shown in FIG. 3, the belt coil diameter is less than the widths of frame side legs 8, 8'. Moreover, when the tongue member A is at an angle to frame 1, as shown in FIG. 2, the belt 6 is released for withdrawal from the reel, and when the tongue member A and frame 1 are longitudinally aligned, as shown in FIG. 3, the belt 6 is braked against withdrawal in a known manner.

In the assembly of the reel device described above, when mounting the wind-up shaft 5 and the spring cover 3 between the side plates or legs 8, 8', the side plates 8, 8' are outwardly momentarily sprung and the inner end of the helical spring 4 then engages the slot in the stub shaft end of the wind-up shaft 5, thus imparting the winding force to the wind-up rod 5. The end of the belt 6 on the tongue member side is introduced from below the tongue member A and passed around the lock bar B, then along the lower surface of the front frame member 9, then through the belt anchorage slot 11 of the wind-up shaft 5 and then engaged with the belt end locking sleeve 7. The belt end locking sleeve 7 bites into and holds the end of the belt. The belt 6 is thus wound up under the force of the spiral spring 4 in a length to take up the slack. The lock cover C is snapped into recesses provided in the bottom corners of the side walls of the tongue member A. The spring cover 3 may be disposed on the outside of the side plate 8, while the belt may also be folded on itself and seamed instead of using the sleeve 7.

Considering the operation of the improved reel device described above, FIG. 2 shows the condition in which the belt is released or unlocked and has been wound to the maximum coil diameter, and FIG. 3 shows the condition in which the belt has been withdrawn or reeled out for the passenger to wear it and in which the belt is locked. When the belt 6 is wound as shown in FIG. 2, the coil diameter of the wound belt 6 becomes larger than the width of the side plates 8, 8' and about equal to the distance between the frame sections 9, 9'. Therefore, the belt as long as 800 mm, for example, can be wound within the present apparatus. Since the reel device is situated in the proximity of the metal, belt anchor fitting, the increased coil diameter is not troublesome or inconvenient to the passenger, not does it detract from the appearance of the safety belt system.

When the passenger applies the safety belt, the belt 6 is withdrawn or reeled out, and the coil diameter of the belt 6 becomes smaller than the width of the frame 1 as shown in FIG. 3 irrespective of the girth of the passenger. The belt 6 is locked in this condition by the lock bar B. The size of the reel device is the same as that of the frame 1 while the belt is worn, and thus smaller than in the conventional devices.

With the improved reel device, the wound quantity of the belt can be increased with different vehicles and with different girths of the passengers. In spite of the increased quantity of the wound belt, the size of the overall device is small when the belt is worn, and the wearer does not experience any discomfort or disagreeable feeling, thus resulting in a greater ratio of vehicle passengers wearing the safety belts. The spiral spring is used in the present device to increase the winding performance and durability, and the belt end is also anchored with the belt end mounting sleeve to improve the productivity.

While there has been described and illustrated a preferred embodiment of the present invention, it is apparent that numerous alterations, omissions and additions may be made without departing from the spirit thereof.

I claim:

1. A vehicle safety belt device comprising a frame member including a cross piece and a pair of transversely spaced parallel side legs extending from said cross piece, a coupling member connected to and projecting forwardly from said frame member, a spool extending between and rotatably supported by said frame side legs, a safety belt having a first end connected to said spool and an opposite end extending to a vehicle anchor point, a spring resiliently biasing said spool to wind up said belt in a coil thereon in a belt retracted condition and a brake bar extending between and rockably supported by the forward ends of said frame side legs, said frame cross piece and side legs being of widths less than the diameter of said coil in said belt retracted condition, said coupling member including a rear cross web having a transversely extending opening formed therein, and a pair of upstanding side walls projecting from said cross web and provided with longitudinal slots slideably engaging the ends of said brake bar, said coupling member being swingable with said brake bar, said belt extending from said spool forwardly through said cross web opening about said brake bar and back through said opening, whereby said coupling member is swingable between a longitudinally extending belt braking position and an angularly extending belt releasing position.

2. The vehicle safety belt device of claim 1 wherein said spring comprises a spiral leaf spring located proximate an end of said spool and having its inner end secured to said spool and its outer end secured to a stationary point relative to said frame member.

3. The vehicle safety belt device of claim 2 wherein said frame side legs have transversely axially aligned openings formed therein, and said spool comprises a shaft journalled in said openings and having a slot formed therein, said belt first end engaging said slot.

4. The vehicle safety belt device of claim 2 wherein said spiral spring is disposed along an inside face of one of said frame side legs and including a cup shaped shell housing said spring and secured to said inside face and having an end wall provided with an opening through which said shaft projects.

5. The vehicle safety belt device of claim 2 wherein said coupling member comprises a buckle engageable tongue member frame member means swingably supporting said tongue member at the forward portion of said frame member.

6. The vehicle safety belt device of claim 5 including a second cross piece extending between said frame side legs forwardly of said spool.

* * * * *